July 26, 1960

V. GAVREAU ET AL 2,946,938

AUTOMATIC CONTROL OF INDUSTRIAL MACHINE
SERVOSYSTEM WITH DIFFERENTIAL
TRANSMITTER

Filed Jan. 25, 1957

United States Patent Office 2,946,938
Patented July 26, 1960

2,946,938
AUTOMATIC CONTROL OF INDUSTRIAL MACHINE SERVOSYSTEM WITH DIFFERENTIAL TRANSMITTER

Vladimir Gavreau and Albert Calaora, Marseille, France, assignors to Centre National de la Recherche Scientifique, Paris, France, a French society Filed Jan. 25, 1957, Ser. No. 636,307

Claims priority, application France Jan. 28, 1956

5 Claims. (Cl. 318—27)

The idea of automatically controlling industrial machines and in particular machine-tools by means of currents of variable frequency or through impulses recorded on moving picture films, phonographic records or magnetic tapes is known in the art. Apparatus based on this principle were described in particular in the U.S. Patent No. 2,213,108 filed October 29, 1934, by W. L. G. Pollard, Jr., the French Patent No. 808,557, filed June 20, 1936, by J. Bergier, A. Eskenazi and V. Gavronsky, the French Patent No. 856,066, filed February 15, 1939, by V. Gavronsky, and the U.S. Patent No. 2,475,245, filed May 1, 1947, by E. W. Leaver and G. R. Mounce.

The improvements described in the present application are intended to simplify and to make less expensive this type of control so that it can be used by small manufacturers. The object of the present invention is a system of simplified direct control of machine-tools by means of magnetic tape or wire and the electronic circuits, electro-mechanical devices, electro-pneumatical devices used to obtain this direct control of machine-tools. Instead of a magnetic tape recorder, any other "acoustic recorder," such as recorders on disks or film can be used with these devices.

According to the present invention, this direct control of industrial machines is obtained by means of a direct control servo-motor as hereinafter described, which is itself controlled by a differential arrangement of synchronous motors, and more particularly of variable reluctance synchronous motors, or any other device which can be used as a remote control receiver and reproducer of recorded operations, provided that it supplies a mechanical torque sufficient to control this servo-motor.

Experience teaches that variable reluctance synchronous motors are particularly well adapted for this type of control. According to the present invention, we make use of a combination of two motors of this kind, one of them being fed with current of constant frequency and rotating at a constant speed, the other being fed by a current of variable frequency and rotating at a variable speed. The difference of these speeds causes a rotation either toward the right or toward the left according as the second mentioned motor is fed with a frequency higher or lower than the constant frequency used for feeding the first mentioned motor.

A variable reluctance synchronous motor is a single phase motor: its rotor is a laminated disc made of a multiplicity of thin metal sheets having a toothed edge and its stator is an electro-magnet having a laminated core and toothed polar pieces. The arrangement described in the present patent application therefore permits, by making use of single phase currents, of obtaining an automatic operation of a lathe by means of a magnetic recorder having three reproducer heads and three ordinary amplifiers. The first of these amplifiers supplies the constant frequency current to the motor which is to rotate at constant speed, whereas the two other amplifiers supply control currents to the variable speed motors corresponding to the two handwheels of the lathe.

Instead of a magnetic recorder and reproducer having three reproducer heads, we may also use an ordinary reproducer having a single reproducer head, provided that use is made, during recording, of currents of different frequencies which are subsequently separated by means of electric filters during reproduction. Use is made in this case, either of "carrier currents" modulated by different frequencies, or of frequency multiplying and reducing arrangements.

We will now describe, by way of non-limitative examples, operation recording and reproducing devices making use of magnetic recorders and reproducers for automatically controlling machine-tools.

Figure 1:
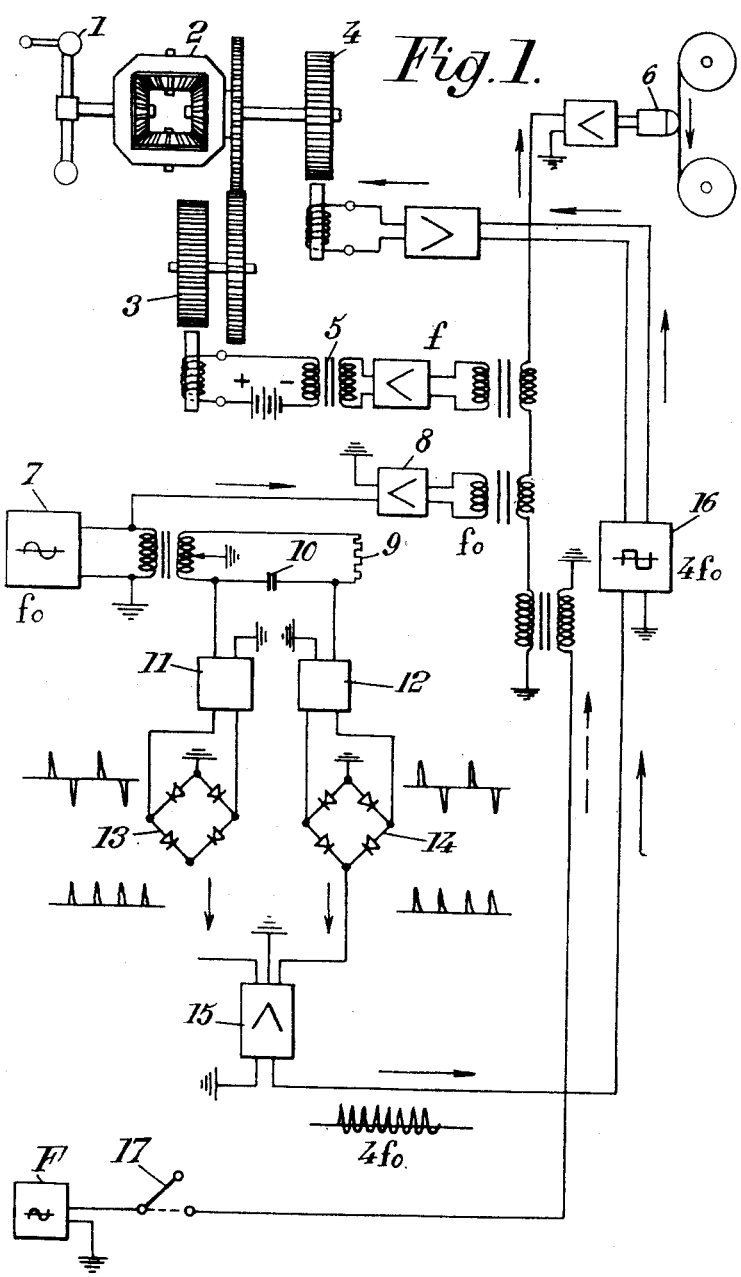
Fig. 1 is a diagrammatical view of a movement recording system making use of a magnetic recorder, use being made simultaneously of a constant reference frequency of 100 Hz. (hertzes) and of a variable frequency averaging 400 Hz.

In the device shown by Fig. 1, the movements of handwheel 1 (which movements are to be recorded) control, through differential gear 2, the rotation of a variable reluctance synchronous motor 3. Another synchronous motor 4, identical to motor 3, runs at a constant speed. Thus handwheel 1 and motor 4, through differential gear 2, control together said motor 3. This motor 3 used here as a generator, rotates at a constant speed as long as handwheel 1 is unmoved and at a variable speed, higher or lower according as handwheel 1 is rotated toward the right or toward the left.

A direct current voltage is applied to the stator of motor (generator) 3. Now, this motor is a variable reluctance motor: its impedance varies periodically when it rotates and there is thus produced an alternating current superimposed on the direct current which is fed thereto. This current, separated by means of transformer 5, is recorded in the recorder 6. It constitutes the control current, of variable frequency $f$, close to 400 Hz. The reference current of constant frequency $f_0 = 100$ Hz. is produced by an oscillator 7 and recorded by magnetic recorder 6 at the same time as the control current $f$. Furthermore, frequency $f_0$ is multiplied by 4 by means of a frequency multiplying arrangement constituted by a resistor phase shifter 9 and a capacitor 10, the amplifier, the clipping circuit and the differentiating circuit means 11 and 12 which transform this current into separate impulses, rectifiers 13 and 14 which rectify these impulses, an amplifier 15 and a relaxation oscillator 16 synchronized by the quadruple frequency impulses thus obtained. It is this current of frequency $4f_0$ which is fed to synchronous motor 4. Finally, auxiliary signals of high frequency F are emitted when the switch 17 is operated. These signals are recorded together with the currents of frequencies $f_0$ and $f$ by recorder 6.

We may, without departing from the principles of our invention, replace the variable reluctance motors such as shown at 3 on Fig. 1 (used to produce the variable frequency $f$) by any convenient rotating generator such as a photoelectric siren.

Figure 2:
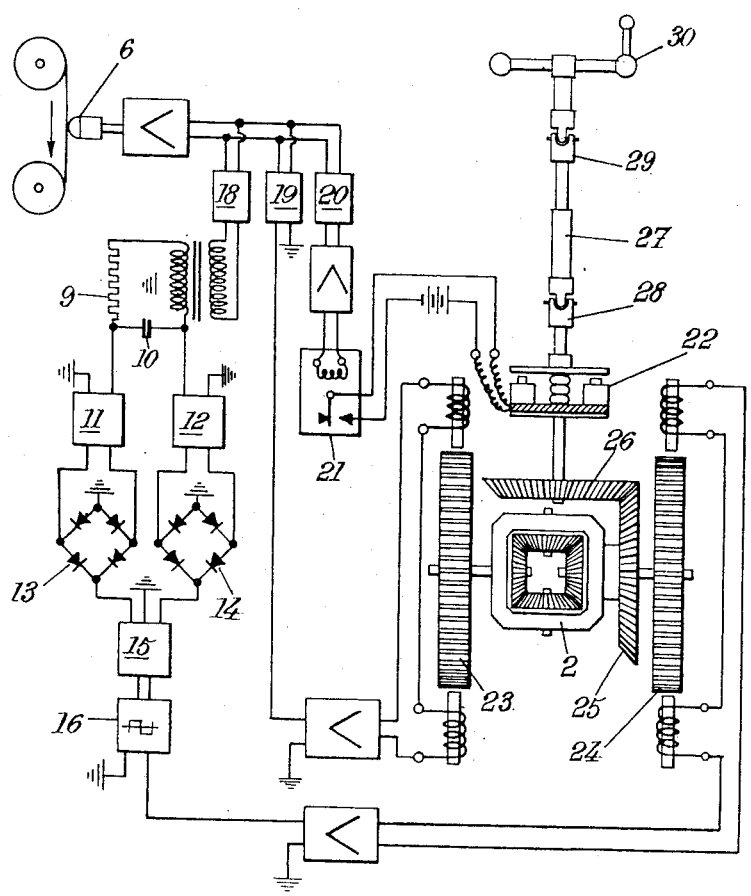
Fig. 2 is a diagrammatical view of a movement reproducer making use of the records obtained by means of the system of Fig. 1.

Fig. 2 shows the movement reproduction from a record obtained by means of the device shown by Fig. 1. The electric filters 18, 19 and 20 separate the currents of respective frequencies $f$, $f_o$ and $F$. The latter serve, in this particular case, to actuate a relay 21 controlling a locking brake 22 when the handwheel that is controlled must remain stationary.

The constant frequency $f_o$ is multiplied by four by the same arrangement 9, 10, 11, 12, 13, 14, 15 and 16 as that shown on Fig. 1 and, while the variable frequency $f$ coming rrom filter 19 actuates the variable reluctance motor 23, the constant frequency $4f_o$ operates motor 24 identical to motor 23. The whole of these two motors 23 and 24, through differential gear 2 and bevel gears 25, 26 and also an expansible rod 27 provided with two universal joints 28, 29, actuates the controlled handwheel 30, or the brush carrying control spindle of the direct action servo-motor hereinafter described.

Here is the principle of "direct control servo-motors." In an ordinary motor, whether it is a steam engine, a compressed air engine or an electric motor including a collector ring system (either of the direct current or of the alternating current type), the so-called "distribution" is always automatic. The slide-valve of a steam engine is driven by the driven shaft, and in an electric motor the collector ring system which serves to distribute the electric current is rigid with the shaft and rotates together therewith. It suffices to make "distribution" independent of the controlled shaft (i.e. to control "distribution" by means of an auxiliary shaft) to obtain that the main shaft of the machine follows in synchronism and accurately all the movements of the auxiliary shaft. The ordinary motor then becomes a "direct action servo-motor." A very small mechanical torque is sufficient to drive the auxiliary distributing shaft, whereas the very high mechanical torque and the whole normal power of the controlled machine are supplied through the main shaft. A direct action servo-motor is a mechanical torque amplifier. Furthermore no reaction of the controlled shaft on the control shaft is produced: the control action is direct and simple.

Figure 3:
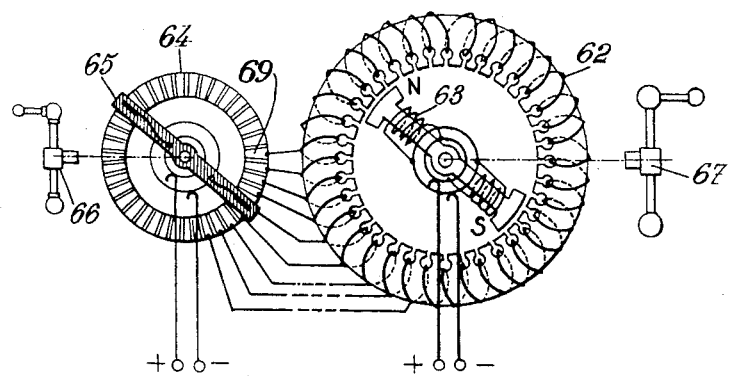
Fig. 3 shows an electric servo-motor having a fixed collector system which is actuated by a movement reproducer, for instance such as that of Fig. 2, for the direct control of industrial machines.

In order to obtain a direct action electric servo-motor, it would suffice to make the movement of the collector ring system independent of the rotation of the motor shaft. According to the present invention, we make use of a more advantageous arrangement which consists in reversing the functions of the stator and of the rotor of a collector ring motor (the functions of the armature and of the field magnet of a direct current motor) as shown by Fig. 3.

In the direct current electric servo-motor shown by this figure, the armature 62 which is wound as a "Gramme ring" is stationary (it constitutes the stator) and the field magnet 63 (of the bipolar or multipolar type) fed by means of windings or formed by permanent magnets, rotates inside the armature.

The collector ring element 64 the electricity conducting zones or strips 69 of which are connected with the respective spires of the stator is also stationary and the rotating brushes 65 are controlled by an auxiliary driving shaft 66 wholly independent of the driven shaft 67 of the motor. A very small mechanical torque is sufficient to rotate brushes 65 and the motor shaft 67 supplies a much higher torque and a power which may reach several kilowatts when the motor is running at relatively high speed. The driven shaft 67 exactly follows the movements of the auxiliary driving shaft 66, with a very small lag when the torque that is required is not too high (this lag does not exceed 1/60 of revolution in a practical embodiment of the invention).

Experience teaches that there are no sparks at the brushes. Besides, switching poles, also mounted to rotate, and fed by auxiliary brushes, might be provided in order to eliminate sparks in the case of motors fed under high voltages.

Various known arrangements may be applied in order to keep the intensity of the current at a substantially constant value, whatever be the speed of revolution of such a motor. In order to keep the pressure of the brushes constant and independent of the speed of revolution, we may use a collector ring in the form of a circular ring or disc and resilient brushes, as shown by Fig. 4, or a cylindrical or annular collector system and the counterweight balanced brushes, as shown by Fig. 5.

Figure 4:
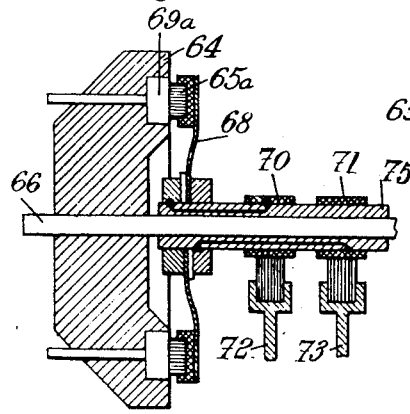
Fig. 4 is a detail view of the fixed collector system and the rotating brushes of the electric servo-motor of Fig. 3.

On Fig. 4, the resiliently supported carbon brushes 65a carried by resilient blades 68 slide on contact studs or conducting zones 69a which form a stationary collector element in the form of a circular ring. Current is supplied to these rotating brushes through slip rings 70 and 71 and stationary brushes 72 and 73, also made of carbon. The rotating brushes and the rings are fixed on an insulating sleeve 75 itself fixed on the auxiliary shaft (driving shaft) 66. This movable unit has a very low inertia and a very small mechanical torque is sufficient to drive shaft 66.

Figure 5:
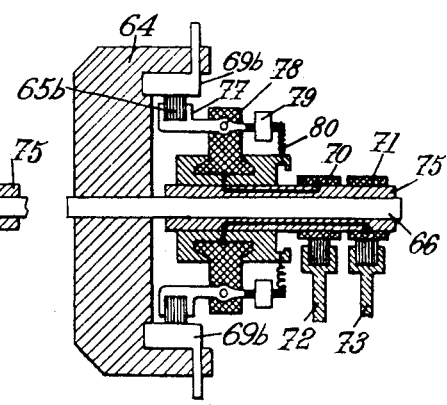
Fig. 5 shows a modification of this type of fixed collector means and rotating brushes for compensating the effects of the centrifugal force.

On Fig. 5, contact studs or conducting zones 69b form an annular collector element inside which rotate the brushes constituted by carbon elements 65b disposed in carriers or levers 77 pivotable about axis 78 and provided with a small counterweight 79 the position of which is adjustable. Springs 80 slightly apply the carbon element of the brush on the conducting strips 69b of the collector element. When the brushes rotate at a high speed, the mass of spring 80 prevents it from operating, but the position of counterweight 79 is adjusted so that the centrifugal force (very small) ensures a pressure of the brushes on the strips of the collector element. As in the case of the collector element shown on Fig. 4, the brush carriers 77 and the ring elements 70 and 71 which feed them with current from brushes 72 and 73 are supported by an insulating sleeve 75 fixed on the auxiliary control shaft 66. The movable unit has a very low inertia and a very small mechanical torque is sufficient to drive shaft 66.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. High-accuracy electric servo-motor, for driving with torque amplification a driven shaft in a machine tool synchronously to the rotation of a driving shaft, the rotation of said driving shaft being controlled by a magnetic record, comprising: a transmitter unit consisting of a stationary collector with a ring surface constituted by a plurality of electricity conducting zones separated by insulating zones, at least one pair of rotating diametrically opposed brushes carried by said driving shaft, means for resiliently pressing said brushes against said ring surface with a pressure substantially independent of the rotation speed of said brushes, and means for feeding a D.C. voltage difference between the two brushes of said pair, said feeding means comprising a sleeve in an insulating material secured around said driving shaft, a pair of electricity conducting slip rings secured around said sleeve, said slip rings being therefore driven in rotation by said driving shaft synchronously with said brushes, a pair of electricity conducting pathes insulated one from the other for connecting separately one of said slip rings with one of said brushes, and two stationary feeding brushes, each one of said feeding brushes being applied against one of said slip rings; a receiver unit consisting of a stationary armature winding with a plurality of stationary spaced taps, the number of said taps being equal to the number of said conducting zones, and a rotating field magnet driving said driven shaft; and a number of leads equal to the number of said conducting zones and said taps, each lead connecting one of said conducting zones to one of said taps with a connection arrangement providing that successive zones of said ring surface are connected to successive taps.

2. High-accuracy electric servo-motor according to claim 1, wherein said rotating field magnet is constituted by at least one permanent magnet.

3. High-accuracy electric servo-motor according to claim 1, wherein said rotating field magnet is constituted by at least one electro-magnet comprising a field pole and a field winding having two terminals, and further comprising means for feeding a D.C. voltage difference between said terminals.

4. High-accuracy electric servo-motor, for driving with torque amplification a driven shaft in a machine tool synchronously to the rotation of a driving shaft, the rotation of said driving shaft being controlled by a magnetic record, comprising: a transmitter unit consisting of a stationary collector with a circular ring constituted by a plurality of electricity conducting zones separated by insulating zones, at least one pair of rotating diametrically opposed brushes, each one of said brushes being carried by a resilient arcuate blade driven by said driving shaft and resiliently pressing the carried brush against said circular ring with a pressure substantially independent of the rotation speed of said driving shaft, and means for feeding a D.C. voltage difference between the two brushes of said pair and including a sleeve in an insulating material secured around said driving shaft, a pair of electricity conducting slip rings secured around said sleeve, said slip rings being therefore driven in rotation by said driving shaft synchronously with said brushes, a pair of electricity conducting pathes insulated one from the other for connecting separately one of said slip rings with one of said brushes, and two stationary feeding brushes, each one of said feeding brushes being applied against one of said slip rings; a receiver unit consisting of a stationary armature winding with a plurality of stationary spaced taps, the number of said taps being equal to the number of said conducting zones, and a rotating field magnet driving said driven shaft; and a number of leads equal to the number of said conducting zones and said taps, each lead connecting one of said conducting zones to one of said taps with a connection arrangement providing that successive zones of said circular ring are connected to successive taps.

5. High-accuracy electric servo-motor, for driving with torque amplification a driven shaft in a machine tool synchronously to the rotation of a driving shaft, the rotation of said driving shaft being controlled by a magnetic record, comprising: a transmitter unit consisting of a stationary annular collector constituted by a plurality of electricity conducting zones separated by insulating zones, at least one pair of rotating diametrically opposed brushes, each one of said brushes being carried by one end of a lever, resilient means acting on the other end of said lever for resiliently applying said brush against the inner surface of said annular collector with a pressure substantially independent of the rotation speed of said driving shaft, and means for feeding a D.C. voltage difference between the two brushes of said pair including a sleeve in an insulating material secured around said driving shaft, a pair of electricity conducting slip rings secured around said sleeve, said slip rings being therefore driven in rotation by said driving shaft synchronously with said brushes, a pair of electricity conducting paths insulated one from the other for connecting separately one of said slip rings with one of said brushes, and two stationary feeding brushes, each one of said feeding brushes being applied against one of said slip rings; a receiver unit consisting of a stationary armature winding with a plurality of stationary spaced taps, the number of said taps being equal to the number of said conducting zones, and a rotating field magnet driving said driven shaft; and a number of leads equal to the number of said conducting zones and said taps, each lead connecting one of said conducting zones to one of said taps with a connecting arrangement providing that successive zones of said annular collector are connected to successive taps.

References Cited in the file of this patent

UNITED STATES PATENTS

| | | |
|---|---|---|
| 752,394 | Gaumont | Feb. 16, 1904 |
| 1,284,219 | Benjamin | Nov. 12, 1918 |
| 1,653,946 | Clausen | Dec. 27, 1927 |
| 1,937,739 | Woodward et al. | Dec. 5, 1933 |
| 2,347,590 | Binder | Apr. 25, 1944 |
| 2,388,498 | Reinhard | Nov. 6, 1945 |
| 2,411,147 | Cooley | Nov. 19, 1946 |
| 2,537,770 | Livingston et al. | Jan. 9, 1951 |
| 2,553,249 | Gretner | May 15, 1951 |

FOREIGN PATENTS

| | | |
|---|---|---|
| 662,944 | Germany | July 25, 1938 |